United States Patent
Vinodkrishnan et al.

(10) Patent No.: US 7,203,929 B1
(45) Date of Patent: Apr. 10, 2007

(54) DESIGN DATA VALIDATION TOOL FOR USE IN ENTERPRISE ARCHITECTURE MODELING

(75) Inventors: Nalledath P. Vinodkrishnan, Overland Park, KS (US); Thomas C. Gifford, Kansas City, MO (US); Lavanya Srinivasan, Overland Park, KS (US); Courtlan Telford, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 712 days.

(21) Appl. No.: 10/431,773

(22) Filed: May 8, 2003

Related U.S. Application Data

(60) Provisional application No. 60/404,824, filed on Aug. 19, 2002.

(51) Int. Cl.
G06F 9/44 (2006.01)
(52) U.S. Cl. ............. 717/124; 717/127; 717/133; 719/328
(58) Field of Classification Search ......... 717/108, 717/126, 124, 125, 127, 133; 719/328
See application file for complete search history.

(56) References Cited

U.S. PATENT DOCUMENTS

| | | | | |
|---|---|---|---|---|
| 5,129,086 A | * | 7/1992 | Coyle et al. | 719/328 |
| 5,941,978 A | * | 8/1999 | Finni | 712/28 |
| 6,138,121 A | * | 10/2000 | Costa et al. | 707/100 |
| 6,334,158 B1 | * | 12/2001 | Jennyc et al. | 719/328 |
| 6,427,230 B1 | * | 7/2002 | Goiffon et al. | 717/108 |
| 6,687,735 B1 | * | 2/2004 | Logston et al. | 709/203 |
| 7,032,229 B1 | * | 4/2006 | Flores et al. | 719/328 |

OTHER PUBLICATIONS

Unified Modeling Language UML Booch & OMT Quick Reference for Rational Rose 4.0, 1996.*
SNAP Foundation Template, Using the Permanent Storage Component, Template Software, 1998, Chapters 1-4.*
SNAP Foundation Template, Using the SNAP Development Environment, Template Software, 1998, Chapters 1-7.*
ADL—An Interface Definition Language for Specifying and Testing Software, Siram Snakar et al, Sun MicroSystems, 1994, 9 pages.*
Lavanya Srinivasan, et al., *Inter-Application Validation Tool for use in Enterprise Architecture Modeling*, filed Nov. 2, 2002, U.S. Appl. No. 10/285,938, Specification (38 pgs.) and Drawings (6 sheets).
Nalledath P. Vinodkrishnan, et al., *Modeling Standards Validation Tool for use in Enterprise Architecture Modeling*, filed Dec. 26, 2002, U.S. Appl. No. 10/329,436, Specification (51 pgs.) and Drawings (16 sheets).

(Continued)

*Primary Examiner*—Todd Ingberg

(57) ABSTRACT

A selected scenario of a design ICD document for an integrated enterprise is validated by examining each IDL call of each sequence diagram forming part of the selected scenario. A list of data attributes contained in one or more of the IDL calls are generated and each IDL call associated therewith is generated. A physical location to which each such IDL call is mapped is then associated with the IDL call. By analyzing the IDL calls and associated physical locations on a data attribute-by-data attribute basis, inconsistencies in the physical mapping of the data attributes to the databases forming an IIS for the integrated enterprise may be identified and subsequently corrected.

16 Claims, 7 Drawing Sheets

OTHER PUBLICATIONS

Nalledath P. Vinodkrishnan, et al., *Analysis Data Validation Tool for use in Enterprise Architecture Modeling*, filed Nov. 1, 2002, U.S. Appl. No. 10/286,526, Specification (46 pgs.) and Drawings (9 sheets).

Lavanya Srinivasan, et al., *Data Validation Tool for Enterprise Architecture*, filed Aug. 7, 2003, U.S. Appl. No. 10/636,121, Specification (43 pgs.) and Drawings 16 sheets).

Lavanya Srinivasan, et al., *Test Integration Tool*, filed Oct. 15, 2003, U.S. Appl. No. 10/686,422, Specification (25 pgs.) and Drawings (11 sheets).

* cited by examiner

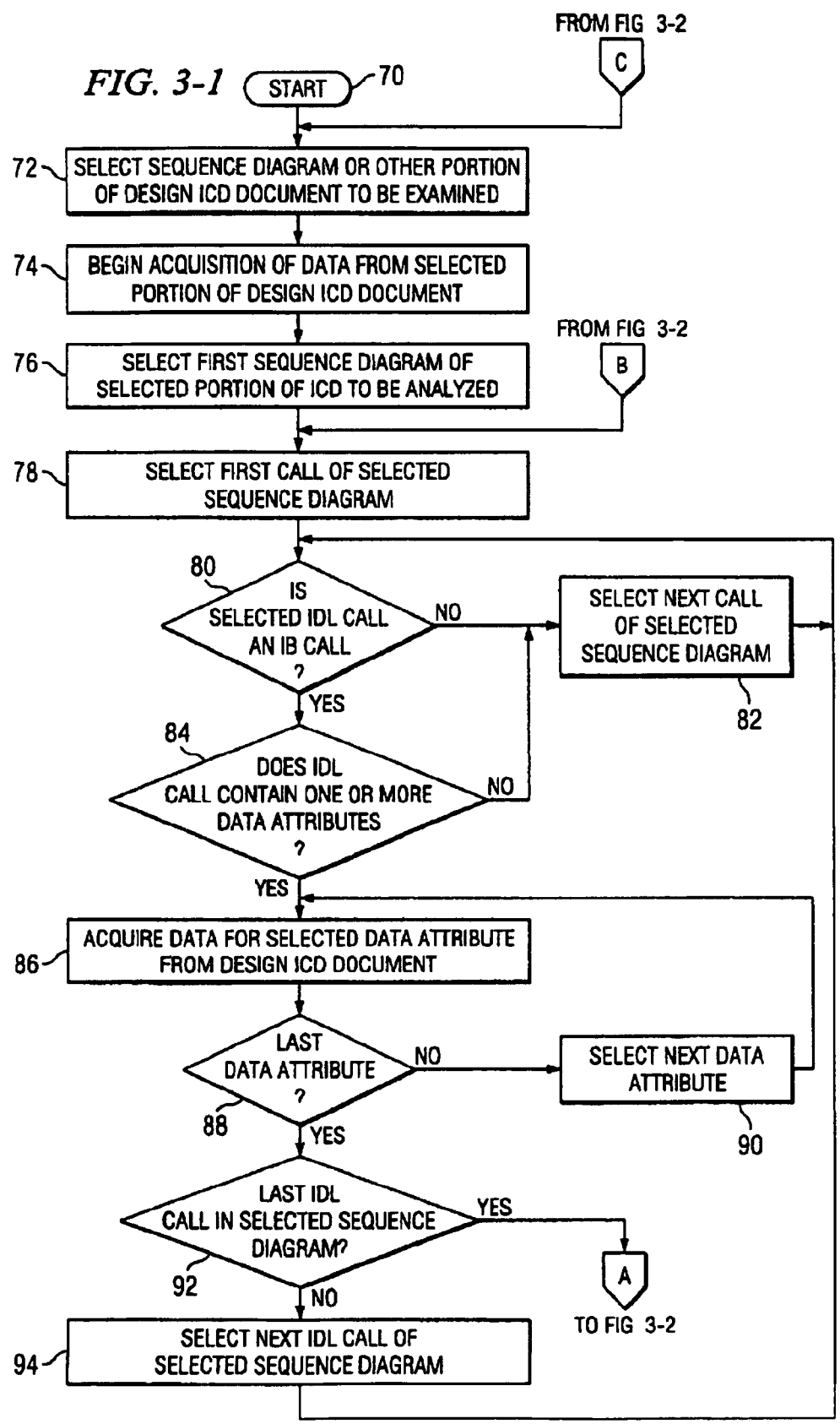

msgInfo

| APPLICATION | MODULE | OPERATION | ACTION | TYPE | TABLE | COLUMN | |
|---|---|---|---|---|---|---|---|
| OM | lbVcsMsg | CREATE | PRODUCER | STRING | XMSN_READY_FCIF_AGRGT | FORM_DATA | IIS |
| OM | lbRetrieveLsr | find_by_lbRetrieveLsrPKey | CONSUMER | STRING | XMSN_READY_FCIF_AGRGT | FORM_DATA | COMMON ORDER REPOSITORY | pon

| APPLICATION | MODULE | OPERATION | ACTION | TYPE | TABLE | COLUMN | |
|---|---|---|---|---|---|---|---|
| OM | lbVcsMsg | CREATE | PRODUCER | STRING | XMSN_READY_FCIF_AGRGT | PRCH_ORDER_NBR | IIS |
| OM | FmsFocReceived | find_by_FmsFocReceivedPKey | CONSUMER | STRING | XMSN_READY_FCIF_AGRGT | PRCH_ORDER_NBR | COMMON ORDER REPOSITORY |
| OM | lbRetrieveLsr | find_by_lb_RetrieveLsrPKey | CONSUMER | STRING | XMSN_READY_FCIF_AGRGT | PRCH_ORDER_NBR | COMMON ORDER REPOSITORY |
| OM | lbLsrHdr | find_by_LsrHdrPKey | CONSUMER | STRING | XMSN_READY_GVIV_AGRGT | PRCH_ORDER_NBR | COMMON ORDER REPOSITORY |

FIG. 5B

DESIGN DATA VALIDATION TOOL FOR USE IN ENTERPRISE ARCHITECTURE MODELING

CROSS-REFERENCE TO RELATED APPLICATIONS

This application is related to U.S. Provisional Application Ser. No. 60/404,824, filed Aug. 19, 2002 entitled "Enterprise Architecture Development Process."

This application is also related to U.S. patent application Ser. No. 10/286,526 filed Nov. 1, 2002 entitled "An Analysis Data Validation Tool For Use In Enterprise Architecture Modeling", Ser. No. 10/285,938 filed Nov. 1, 2002 entitled "An Inter-Application Validation Tool For Use In Enterprise Architecture Modeling", Ser. No. 10/285,884 filed Nov. 1, 2002 entitled "Data Integration Techniques For Use In Enterprise Architecture Modeling" and Ser. No. 10/329,436 filed Dec. 26, 2002 entitled "A Modeling Standards Validation Tool For Use In Enterprise Architecture Modeling, all of which are assigned to the Assignee of the present application and hereby incorporated by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a design data validation tool suitable for use in enterprise architecture modeling. By mapping data attributes used by applications of an integrated enterprise to physical databases of the enterprise, the design data validation tool may be used to correct modeling errors before initiating coding of the integrated enterprise.

BACKGROUND OF THE INVENTION

The rapid evolution of computer and communication technologies coupled with the robust economies of the 1980s and 1990s resulted in unprecedented growth in the information technology (or "IT") field. During this period, the need to establish a competitive advantage drove companies to faster and faster rates of change to support new product offerings and expanded services. As a result of these market pressures and time constraints, most companies elected to support new products and services by adding additional back office systems. However, due to the lack of mature integration technologies, the new systems were connected to the existing IT systems by making direct connections to the software routines already in use. The vulnerability of this design is that a change in one system produces a "ripple effect" change in every system it connects with. Over time, this incremental stacking of software systems can result in an integration ceiling. That is, at a certain point, more effort is spent on the connections than on new functionality and further expansion becomes cost prohibitive.

In the late 1990s, new integration technologies emerged that made it possible to "loosely couple" applications so that systems are no longer directly connected. Thus, changes in one system would not cause a ripple effect in any other systems. The most notable of these technologies are Message Oriented Middleware (or "MOM"), Publish and Subscribe messaging, and Object Request Brokers (or "ORBs"). These technologies enabled companies to re-architect their conglomeration of systems into an architecture that allows them to expand in a cost-effective manner. Technologies such as these that address the problem of integrating existing systems with new systems in an organized, efficient, and economically scaleable manner can be referred to collectively as enterprise application integration (or "EAI") technologies.

An integrated enterprise may have any number of applications which interact with one or more shared databases (also referred to as an integrated information store (or "IIS")) of the integrated enterprise through a data access layer (or "DAL"). Among other things, interface control documents (or "ICDs") for an integrated enterprise describes all of the application-to-database operations taking place within the integrated enterprise. An interaction with a database of an integrated enterprise is typically in the form of an interface definition language (or "IDL") "call". More specifically, an IDL call is comprised of a first (or "logical operation name") portion, a second (or "logical data aggregate name") portion and a third (or "data attribute") portion. The logical operation name portion of the call describes the type of application-database operation to be conducted, the logical data aggregate name portion of the call describes the name of the data to which the operation is applied and the data attribute portion of the call is comprised of one or more data attributes, each of which describes a discrete characteristic of the data involved in the application-database operation.

Application-database operations may be divided into two types of operations—those that produce data and those that consume data. As defined herein, data producing operations are those operations which involve data being written to a database. Data consuming operations, on the other hand, are herein defined as those operations which involve data being read from a database. Many problems in application-database operations arise when a system designer fails to ensure that a correspondence exists between the data produced and the data consumed. In other words, application-database operations which involve consuming data which was never produced (hereafter referred to as a "producer exception") or producing data which is never consumed (hereafter referred to as a "consumer exception") should be avoided. Of the two, the former is a more serious problem. Since data cannot be consumed before it is produced, a producer exception causes an error in the system. Conversely, while a consumer exception does not cause a system error, since there is no reason to produce data which is never consumed, a consumer exception unnecessarily wastes system resources.

Errors such as these can only be identified through a detailed manual examination of the ICD documents which model an enterprise. Such a task can, however, be quite difficult. In U.S. patent application Ser. No. 10/286,526 filed Nov. 1, 2002 and previously incorporated by reference, we disclosed a tool capable of identifying exceptions in database operations contained within an analysis model of an enterprise based upon an examination of the usage of data attributes in the database operations. However, as it is a tool for analyzing the analysis model of an enterprise, the aforementioned tool can only examine application-database operations between the various applications and the DAL—the logical interface to the IIS. By limiting the examination of the model in this manner, however, any number of inconsistencies in the model may be missed. For example, a single data attribute may be mapped to multiple fields in the physical databases which collectively form the IIS. Conversely, a single field in one of the physical databases may be mapped to multiple data attributes. Finally, a data attribute may not be mapped to a physical database at all. It is, therefore, the object of this invention to provide a tool capable of identifying these or other exceptions in physical database operations contained within a design model of an enterprise.

SUMMARY OF THE INVENTION

The present invention is directed to a method and apparatus for validating a model of an integrated enterprise to a physical layer of one or more databases forming an IIS for the integrated enterprise. In accordance with the present invention, IDL calls to/from the IIS are analyzed on a data attribute-by-data attribute basis. The data attributes of the analyzed IDL calls are then associated with physical locations to which the analyzed IDL calls are mapped. Inconsistencies between the mapping of data producing ones of the analyzed IDL calls and data consuming ones of the analyzed IDL calls are identified, again on a data attribute-by-data attribute. The model of the integrated enterprise may then be modified to correct the identified inconsistencies in mapping the IDL calls to the physical databases.

DESCRIPTION OF DRAWINGS

FIGS. 3-1 and 3-2, collectively referred to as FIG. 3 hereafter, illustrate a flowchart of a method for analyzing the model of the integrated enterprise of FIG. 1 using the device of FIG. 2.

FIGS. 5A and 5B, collectively referred to as FIG. 5 hereafter, illustrate a report constructed by applying the method of FIG. 3 to a selected portion of a design ICD document constructed using the device of FIG. 2.

DETAILED DESCRIPTION OF THE INVENTION

Figure 1:
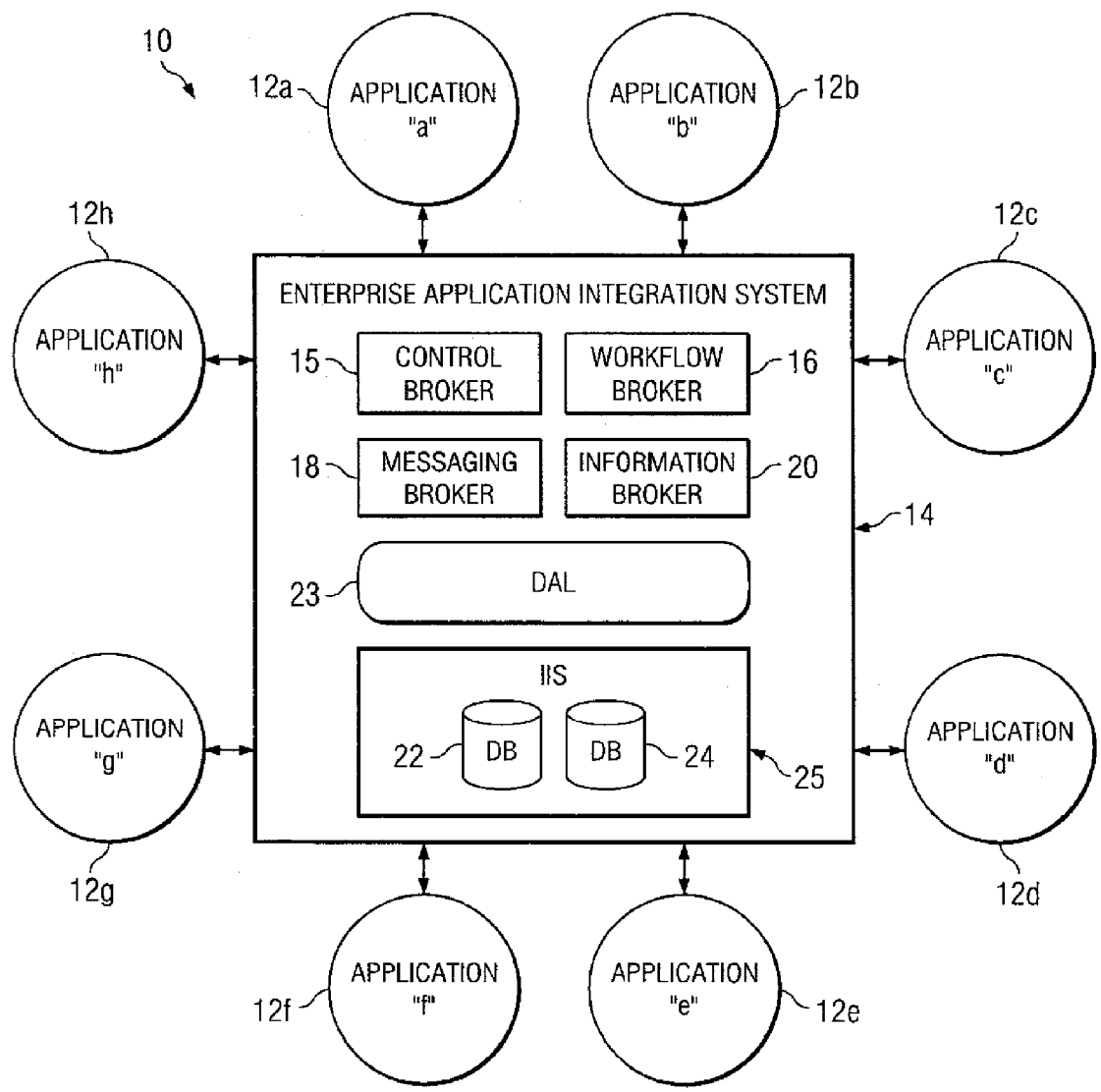
FIG. 1 is a block diagram of an integrated enterprise.

Referring first to FIG. 1, an integrated enterprise 10 will now be described in greater detail. As may now be seen, plural applications have been integrated into the integrated enterprise 10 by an EAI system 14. In the embodiment of the invention disclosed herein, a first application 12a, for example, an order processing application, a second application 12b, a third application 12c, a fourth application 12d, a fifth application 12e, a sixth application 12f, a seventh application 12g, an eighth application 12h, a first database 22, for example, a common order repository database, and a second database 24 have all been integrated into the integrated enterprise 10. It should be clearly understood, however, that any number of applications and/or databases may be integrated into the integrated enterprise 10. Once integrated into the integrated enterprise 10, any of the applications 12a through 12f may exchange messages with any of the other applications integrated into the integrated enterprise 10 or access any of the databases shared by the integrated enterprise 10. As illustrated in FIG. 1, the first database 22 and the second database 24 collectively form an IIS 25 to be shared by the integrated enterprise 10. Of course, it is fully contemplated that the IIS 25 may include any number of databases (or "DBs") to be shared by the integrated enterprise 10. Furthermore, while FIG. 1 shows the integrated enterprise 10 as being comprised of plural applications and plural databases integrated together by the EAI system 14, it is fully contemplated that a wide variety of other types of devices may be integrated into, and form part of, the integrated enterprise 10.

The EAI system 14 includes plural components which collectively enable integration of the integrated enterprise 10 so that the aforementioned exchange of messages between the applications 12a through 12f and/or accesses of the shared databases 22, 24 forming the IIS 25 may be conducted. The components of the EAI system 14 which enable such exchanges and/or accesses include a control broker ("15"), workflow broker ("WB") 16, a messaging broker ("MB") 18 and an information broker ("IB") 20. While a complete description of the operation of the control broker 14, the workflow broker 16, the messaging broker 18 and the information broker 20 is beyond the scope of this application, briefly, using a set of pervasive services (not shown), the control broker 15, the workflow broker 16, the messaging broker 18 and the information broker 20 implement specific business logic to integrate the integrated enterprise 10.

More specifically, the control broker 15 provides data transformation, persistence and business rules processing functionality to the integrated enterprise 10. Systems may interface with the control broker 15 in either a request/reply or a publish/subscribe fashion. The messaging broker 18 enables system integration at either the application level (the applications 12a through 12f) or the database level (the shared databases 22 and 24 forming the IIS 25). Once an event is defined, or "published", in a source system, other systems interested in that event can "subscribe" to the published event. The messaging broker 18 then attends to delivery of event messages to subscribing systems.

The workflow broker 16 is responsible for process integration and enables business automation capabilities. To initiate work, an application, for example, the application 12a, interfaces with the workflow broker 16 through the messaging broker 18. Finally, the information broker 20 abstracts systems from the shared databases 22 and 24. On one end, the information broker 20 attaches itself to a logical data structure, more specifically, data access layer ("DAL") 23, within the IIS 25 and, on the other end, exposes interfaces to systems that require data to be persisted to disparate databases. In this manner, the information broker 20 provides an efficient mechanism for applications, for example, the applications 12a through 12f, to access the shared databases 22 and 24 which form the IIS 25. Of course, it should be clearly understood that the foregoing description of the control broker 15, the workflow broker 16, the messaging broker 18 and the information broker 20 has been greatly simplified for ease of understanding. It should be further understood that, as described and illustrated herein, the EAI system 14 has been greatly simplified in that other components of the EAI system 14 which, like the control broker 15, the workflow broker 16, the messaging broker 18 and the information broker 20, contribute to the integration of the enterprise 10 have been omitted from the drawing for ease of description.

Figure 2:
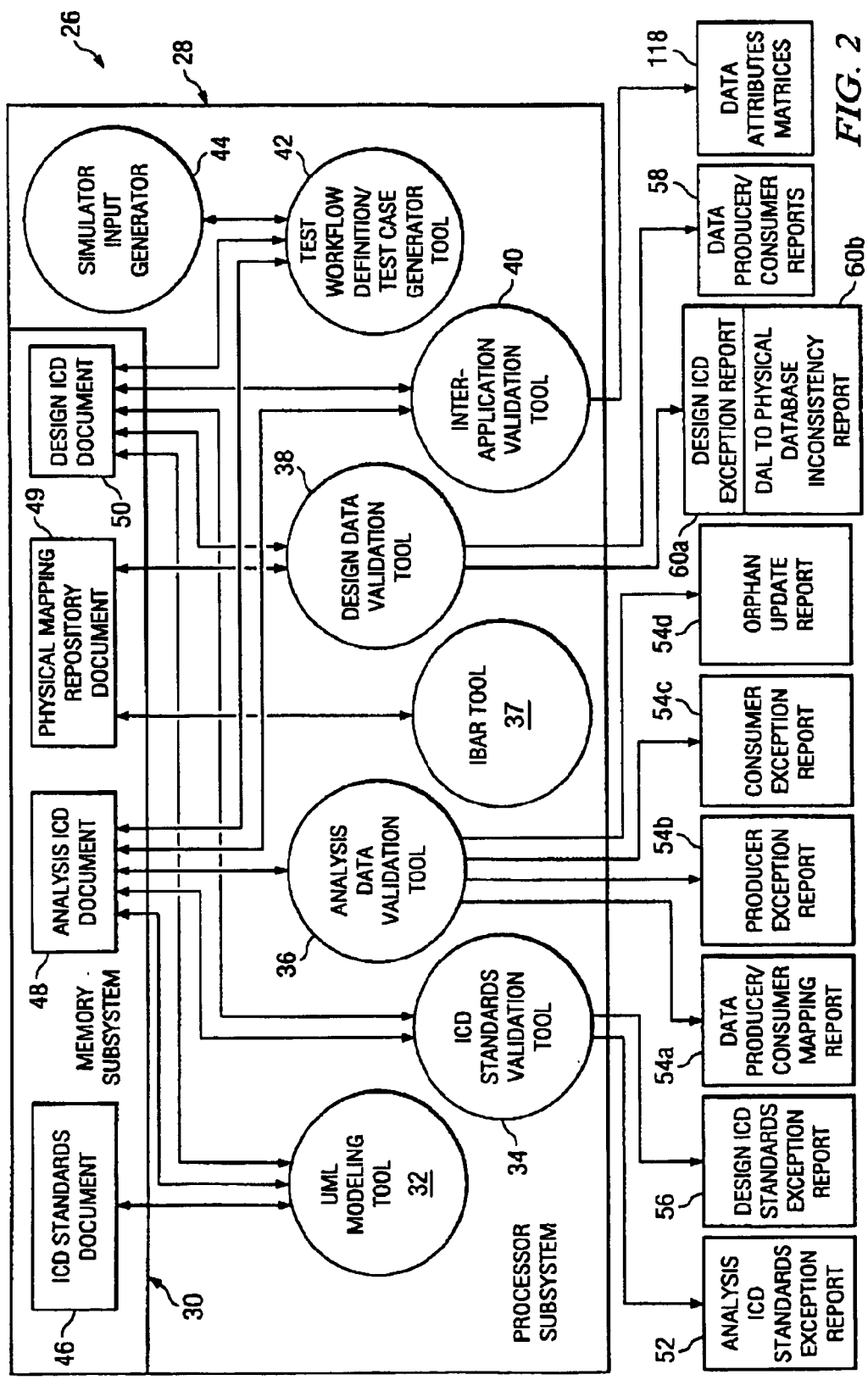
FIG. 2 is a device for both constructing and analyzing a model of the integrated enterprise of FIG. 1.

Referring next to FIG. 2, a device 26 for constructing and subsequently analyzing a model of the integrated enterprise 10 of FIG. 2 will now be described in greater detail. The integrated enterprise modeling device 26, which typically resides within a computer system, for example, a personal computer ("PC") having a processor subsystem 28 and a memory subsystem 30 coupled to one another, includes first, second, third, fourth, fifth, sixth, seventh and eighth tools 32, 34, 36, 37, 38, 40, 42 and 44. Each one of the tools 32, 34, 36, 37, 38, 40, 42 and 44 is a software application comprised of a series of instructions encoded in the memory subsystem 30 of the integrated enterprise modeling device 26 as computer readable program code and executable by the processor subsystem 28 of the integrated enterprise modeling device 26. As used herein, the term "processor subsystem" refers to the collective processing capacity of the computer system in which the integrated enterprise modeling device 26 resides. Similarly, as used herein, the term "memory subsystem" refers to the collective memory capacity of the computer system in which the integrated enterprise modeling device 26 resides. While it is contemplated that, in one embodiment of the invention, the computer system may be exclusively dedicated to the functionality which embodies the integrated enterprise modeling device 26, more typically, the computer system will be configured to provide additional functionality (not shown) and will include a platform (also not shown), for example, the Windows NT platform manufactured by Microsoft Corporation of Redmond, Wash., from which the integrated enterprise modeling device 26 is launched.

As will be more fully described below, after launching the integrated enterprise modeling device 26 from the Windows NT platform, a computer user models the integrated enterprise 10 by constructing a series of documents, which include first, second, third and fourth documents 46, 48, 49 and 50, using selected ones of the tools 32, 34, 36, 37, 38, 40, 42 and 44. The series of documents created by the computer user and subsequently stored in the memory subsystem 30 collectively describe the integrated enterprise 10. Of course, it should be clearly understood that, as described and illustrated herein, the integrated enterprise modeling device 26 has been greatly simplified and that various ones of the documents constructed during the modeling process and/or the tools used to construct those documents have been omitted for ease of description.

The first (or "ICD standards") document 46 documents the guidelines with which the second (or "analysis ICD") document 48 and the fourth (or "design ICD") document 50 are to be subsequently constructed. The ICD standards document 46 is constructed using a word processing application (not shown), for example, Microsoft Word. The analysis ICD document 48 identifies the sequence of events exchanged between applications, the interfaces between applications and brokers and the interfaces between applications. The analysis ICD document 48 is constructed using the first (or "UML modeling") tool 32. The third (or "physical mapping repository") document 49 contains details of the physical data mapping of the IDL calls contained in the design ICD document 50 from the information broker 20 to the physical databases 22 and 24 which collectively make up the IIS 25. The physical mapping repository document is constructed using the fourth (or "information broker access repository (or "IBAR") tool 37. Finally, the design ICD document 50 identifies the sequence of events exchanged between applications, the interfaces between applications and brokers and the interfaces between applications. The design ICD document 50 is constructed from the analysis ICD document 48 using the UML modeling tool 32. The UML modeling tool 32 used to construct the analysis ICD document 48 and/or the design ICD document 50 may be any one of a number of commercially available software applications. For example, "Rational Rose", a software application manufactured by Rational Software Corporation of Cupertino, Calif. and Lexington, Mass. would be suitable for constructing the analysis ICD document 48 and the design ICD document 50.

After the ICD standards document 46 is constructed using Microsoft Word or another word processing program, the UML modeling tool 32 applies the analysis ICD standards contained in the ICD standards document 46 to information, typically in the form of plural documents (not shown) describing the system requirements of the integrated enterprise 10 to be modeled to construct the analysis ICD document 48. After the analysis ICD document 48 is constructed, the ICD standards validation tool 34 checks the analysis ICD document 48 to determine that the analysis ICD document 48 complies with the analysis ICD standards set forth in the ICD standards document 46. After completing an analysis of the analysis ICD document 48, the ICD standards validation tool 34 generates an analysis ICD standards exceptions report 52 which, in turn, may be used as a guide in a subsequent modification of the analysis ICD document 48 (if needed) to place the analysis ICD document 48 into compliance with the analysis ICD standards set forth in the ICD standards document 46.

After the analysis ICD document 48 has been brought into compliance with the analysis ICD standards set forth in the ICD standards document 46, construction of an interim analysis model of the integrated enterprise 10 is complete and construction of an integrated analysis model of the integrated enterprise 10 commences. To do so, the analysis data validation tool 36 analyzes the analysis ICD document 48 to validate the various logical accesses of the shared databases 22 and 24 by the applications 12a through 12f of the integrated enterprise 10 which are described in the analysis ICD document 48. After completing an examination of the analysis ICD document 48, the analysis data validation tool 36 generates, for data attributes that are stored in and/or retrieved from the shared databases 22 and 24 by the applications 12a through 12f, an analysis data producer/consumer mapping report 54a, a producer exception report 54b, a consumer exception report 54c and an orphan update report 54d which identifies data attributes updated but never created. By identifying, in the analysis data producer/consumer reports 54a through 54d, (1) a map of producers and consumers of data attributes; (2) a first exception report identifying data attributes which one or more of the applications 12a through 12f seeks to consume but none of the applications 12a through 12f ever produced; and/or (3) a second exception report identifying data attributes produced by one or more of the applications 12a through 12f but never consumed by any of the applications 12a through 12f, the analysis data producer/consumer reports 54a through 54d may be used as a guide during a subsequent modification of the analysis ICD document 48, again using the UML modeling tool 32, to correct any errors contained in the analysis ICD document 48, thereby constructing an integrated analysis model of the integrated enterprise 10.

It should be noted that, by modifying the analysis ICD document 48 based upon the information contained in the analysis data producer/consumer reports 54a through 54d, modeling errors contained in the analysis ICD document 48 may be identified and corrected relatively early in the modeling process. Furthermore, once the results of an application of the analysis data validation tool 36 against the analysis ICD document 48 indicates a correspondence between producers and consumers of data attributes, the analysis ICD document 48 may be deemed as having been validated for any further usages thereof.

Once the analysis ICD document 48 has been validated, the UML modeling tool 32 is then used to construct the design ICD document 50, this time by applying the design ICD standards contained in the ICD standards document 46 to information, typically comprised of the analysis ICD document 48 and additional documentation detailing the technologies and interfaces of the integrated enterprise 10, to construct the design ICD document 50. After the design ICD document 50 is constructed, the ICD standards validation tool 34 checks the document to determine whether the design ICD document 50 complies with the design ICD standards set forth in the ICD standards document 46. After completing an analysis of the design ICD document 50, the ICD standards validation tool 34 generates a design ICD standards exceptions report 56 which, in turn, may be used as a guide in a subsequent modification of the design ICD document 50 into compliance with the design ICD standards set forth in the ICD standards document 46.

In accordance with the embodiment of the invention set forth herein, the ICD standards document 46 contains both the analysis ICD standards and the design ICD standards for the integrated enterprise 10. In further accordance with the disclosed embodiment, a single tool, specifically, the ICD standards validation tool 34, applies the analysis ICD standards and the design ICD standards contained in the ICD standards document 46 to the analysis ICD document 48 and the design ICD document, respectively, to produce the analysis ICD standards exception report 52 and the design analysis ICD standards exception report 56. It should be clearly understood, however, that, in alternate embodiments of the invention, the analysis ICD standards and the design ICD standards may be maintained in separate documents and, in further alternate embodiments of the invention, discrete tools, specifically, an analysis ICD standards validation tool and a design ICD standards validation tool, may be used to examine the analysis ICD document 48 and the design ICD document 50, respectively. Finally, in still another embodiment of the invention, the functionality residing in the ICD standards validation tool 34 may be placed within both the analysis data validation tool 36 and the design data validation tool 38, respectively. In such an embodiment, the analysis data validation tool 36 would generate the analysis ICD standards exception report 52, for example, at the same general time that the analysis data validation tool 36 generates analysis data producer/consumer reports 54*a* through 54*d*. Similarly, in this embodiment, the design data validation tool 38 would generate the design ICD standards exception report 56, for example, at the same general time that the design data validation tool 38 generates design data producer/consumer reports 58, design ICD exception report 60*a* and data access layer-to-physical database inconsistency report 60*b*.

After the design ICD document 50 has been brought into compliance with the design ICD standards set forth in the ICD standards document 46, construction of an interim design model of the integrated enterprise 10 is complete and construction of an integrated design model of the integrated enterprise 10 commences. To do so, the IBAR tool 37 is used to construct a map of the IDL calls contained in the design ICD document 50 to physical locations within the shared databases 22 and 24 forming the IIS 25. The IBAR tool 37 has access to all of the IDL calls between the information broker 20 and the application 12*a* through 12*f* and brokers 15 through 18 which are constructed and documented by IB and data management teams for the integrated enterprise 10. From this information, the IBAR tool 37 constructs the physical mapping repository document 49 which maps these IDL calls to physical locations within the shared databases 22 and 24.

After constructing the physical mapping repository document 49, analysis of the design ICD document 50 proceeds by generating, using the design data validation tool 38, design data producer/consumer reports 58 for data attributes that are written to and/or retrieved from the shared databases 22 and 24 by the applications 12*a* through 12*f*. It should be clearly understood that the design data producer/consumer reports 58 may include one or more of a design data producer/consumer mapping report, a producer exception report, a consumer exception report and an orphan update report and appear in the drawings as a single element purely for ease of illustration. The design data validation tool 38 may also generate the design ICD exception report 60*a* and the data access layer-to-physical database inconsistency report 60*b* to identify inconsistencies, within the design ICD document 50, in mapping data attributes to the physical layer of the shared databases 22 and 24.

By identifying, in the design data producer/consumer reports 58, the design ICD exception report 60*a* and the data access layer-to-physical database inconsistency report 60*b*: (1) a map of producers and consumers of physical data attributes; (2) a first exception report identifying physical data attributes which one or more of the applications 12*a* through 12*f* seeks to consume but none of the applications 12*a* through 12*f* ever produced; (3) a second exception report identifying physical data attributes produced by one or more of the applications 12*a* through 12*f* but never consumed by any of the applications 12*a* through 12*f*; and/or (4) inconsistencies in mapping data attributes from the data access layer to the physical layer of the shared databases 22 and 24, the design data producer/consumer reports 58, the design ICD exception report 60*a* and the data access layer-to-physical database inconsistency report 60*b* may be used as a guide during a subsequent modification of the data ICD document 48, thereby constructing an integrated design model of the integrated enterprise 10. As before, it should be noted that, by modifying the design ICD document 48 based upon the information contained in the design data producer/consumer reports 58, the design ICD exception report 60*a* and/or the data access layer-to-physical database inconsistency report 60*b*, modeling errors contained in the design ICD document 50 may be identified and corrected relatively early in the modeling process, typically prior to coding and/or testing of the integrated enterprise 10. Finally, once the results of an application of the design data validation tool 38 against the design ICD document 50 indicates a correspondence between producers and consumers of data attributes and the absence of any data access layer-to-physical database inconsistencies, the design ICD document 50 may be deemed as having been validated for any further usages thereof.

While the analysis data validation tool 36 and the design data validation tool 38 are used to identify errors in application-to-database calls within the model of the integrated enterprise 10, the inter-application validation tool 40 is used to identify errors in application-to-application calls within the model of the integrated enterprise 10 by analyzing the application-to-application calls within the model of the integrated enterprise 10 on a data attribute-by-data attribute basis. As disclosed herein, the inter-application validation tool 40 is suitable for use with either the analysis ICD document 48 and/or the design ICD document 50 which model the integrated enterprise 10. Typically, the inter-application validation tool 40 would be used to examine the analysis ICD document 48 subsequent to the examination thereof by the analysis data validation tool 36 and prior to construction of the design ICD document 50. Similarly, the inter-application validation tool 40 would be used to examine the design ICD document 50 subsequent to examination thereof by the design data validation tool 38.

The test workflow definition/test case generation tool 42 defines all of the integration scenarios that need to be tested during end-to-end testing and generates integration test cases for the integration scenarios from the analysis and design ICD documents 48 and 50. Finally, the simulator input generator 44, which uses the test workflow definition/test case generator tool 42, is an automated testing tool that allows simulation of external systems for interfaces testing. The simulator input generator 44 also generates the interface information required for simulating the interfaces.

Figures 2, 3:
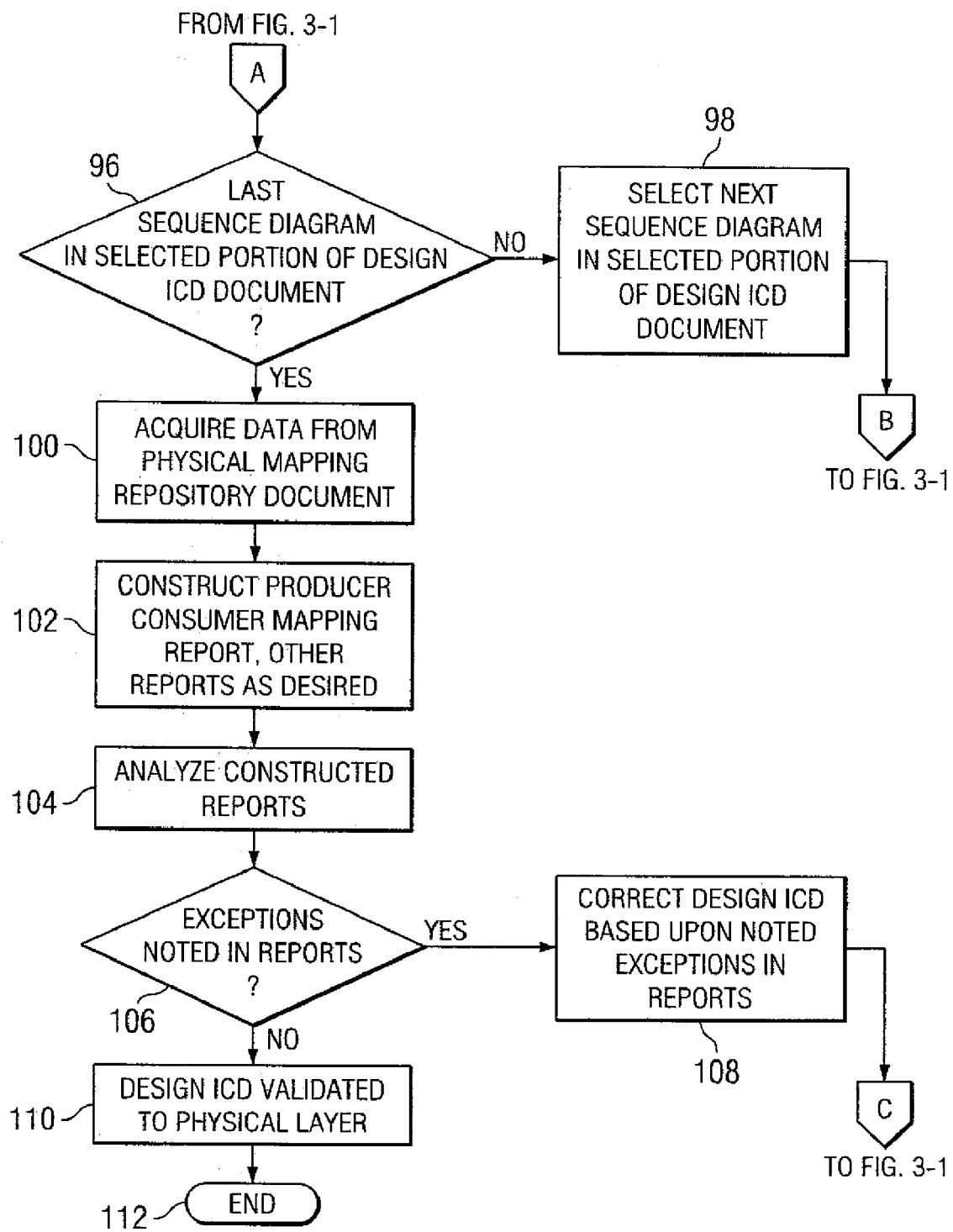

Referring next to FIG. 3, a method for analyzing application-physical database operations for a model of an integrated enterprise, for example, the integrated enterprise 10, will now be described in greater detail. The techniques disclosed herein may be used in connection with a variety of modeling operations. For example, the disclosed techniques may be used to perform design data validation on a model of an integrated enterprise. As previously set forth, an integrated enterprise typically has plural applications which share a database. An integrated enterprise is deemed to have been validated when all data for the integrated enterprise which is produced is also consumed and there are no inconsistencies between the mapping of the produced data to the physical layer of the database and the mapping of the consumed data to the physical layer of the database. Thus, a model of an integrated enterprise is deemed to be validated when the design data validation tool 38 indicates that there are neither producer exceptions, consumer exceptions, nor mapping inconsistencies for the design model of that integrated enterprise.

Prior to describing this method, however, a brief description of a design ICD document, for example, the design ICD document 50 and producer/consumer exception reports produced by the design data validation tool 38 upon examination of the design ICD document 50 will greatly facilitate an understanding of the present invention. The analysis ICD document 48 discussed at great length in prior application Ser. No. 10/286,526 filed Nov. 1, 2002 and previously incorporated by reference included only a class entity to represent each system, for example, an application, broker or database. In contrast, the design ICD document 50 includes plural entities for each system which vary depending on the transfer technology (or technologies) used by the system. All systems require a processor entity. Systems using extensible markup language (or "XML") also require a hypertext transfer protocol (or "HTTP") connector entity while systems using message broker require both a publisher entity and a subscriber entity. Finally, systems using common object request broker architecture (or "CORBA") require both a StorageHome interface entity and a StorageHome-Factory interface entity for each interface class operation, e.g., a CORBA method, for each interface level class entity, e.g., a CORBA module.

Figure 4:
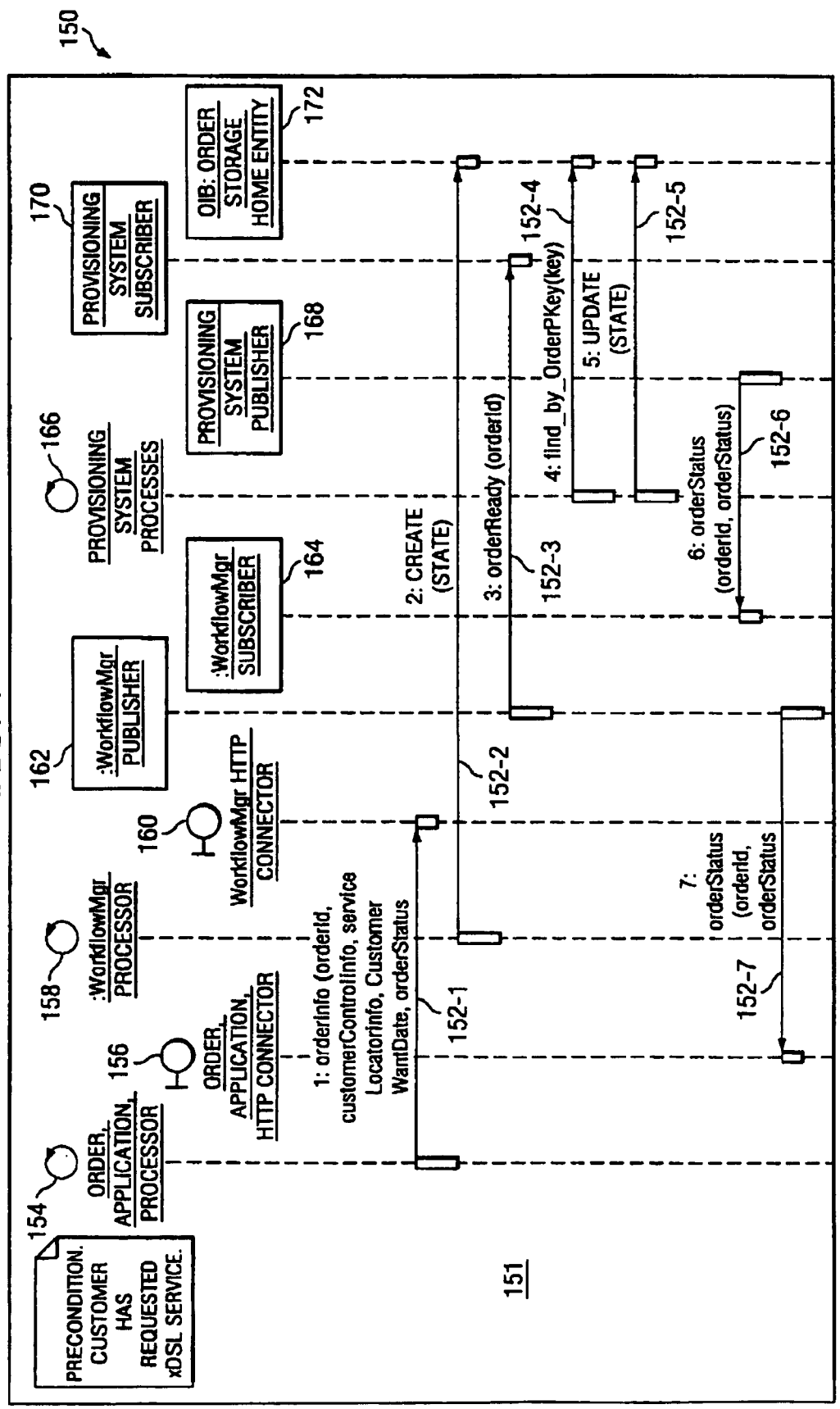
FIG. 4 illustrates a portion of a design ICD document modeling the integrated enterprise of FIG. 1 which is constructed using the device of FIG. 2.

FIG. 4 illustrates a portion of an exemplary design ICD document 150, which is typically stored in the memory subsystem 30 of the integrated enterprise modeling device 26, as it is graphically displayed to the user by the UML modeling tool 32. The design ICD document 150 is comprised of plural sequence diagrams, of which only a first sequence diagram 151 may be seen in FIG. 4. Each sequence diagram, for example, the sequence diagram 151, describes a task to be performed by the integrated enterprise modeled by the design ICD document 150. To describe a task, the sequence diagram 151 identifies the interface entities of the applications, brokers and/or other components of the integrated enterprise 10 involved in performing the task. For example, for the "Install xDSL" task described by the sequence diagram 151, processor and HTTP connector interface entities 154 and 156 of the order processing application 12a; processor, HTTP connector, publisher and subscriber interface entities 158, 160, 162 and 164 of the workflow manager 16; processor, publisher and subscriber interface entities 166, 168 and 170 of a provisioning system (not shown) forming part of the EAI system 14; and a Storage-Home interface entity 172 for the "create" operation of the "order" interface class entity are the subject of various IDL calls which collectively make up the "install xDSL" task.

Typically, each type of interface entity involved in the task is represented, in the sequence diagram 151, by an iconic representation and the alphanumeric character string identifying the name of the interface entity involved in the task. Beneath the iconic representations/names of the components of the integrated enterprise 10 involved in the "install xDSL" task described by the sequence diagram 151, a series of IDL calls 152-1, 152-2, 152-3, 152-4, 152-5, 152-6 and 152-7 are listed in a descending order which corresponds to the order of execution when the task described by the sequence diagram 151 is performed. Each IDL call has a source interface entity and a target interface entity. In the sequence diagram 151, each IDL call forming part of the task is iconically represented by an arrow with the source interface entity for the IDL call generally aligned with the tail of the arrow and the target interface entity for the IDL call generally aligned with the head of the arrow. For example, the source interface entity for the IDL call 152-2 is the workflow manager processor 158 while the target interface entity for the IDL call 152-2 is the StorageHome entity 172. Positioned above each iconic representation of an IDL call in the sequence diagram 151 is a description of the IDL call. The description of each IDL call is comprised of two portions—a first portion comprised of an operation name and a second portion comprised of one or more data attributes. For example, the IDL call 152-2 is comprised of the operation name "create" and the data attribute "state." Of course, it should be clearly understood that the particular tasks, interface entities, iconic representations, operations and data attributes used in the sequence diagram 151 are purely exemplary and it is fully contemplated that a wide variety of other tasks, interface entities, iconic representations, operations and data attributes may be used in their stead.

Figure 5A:
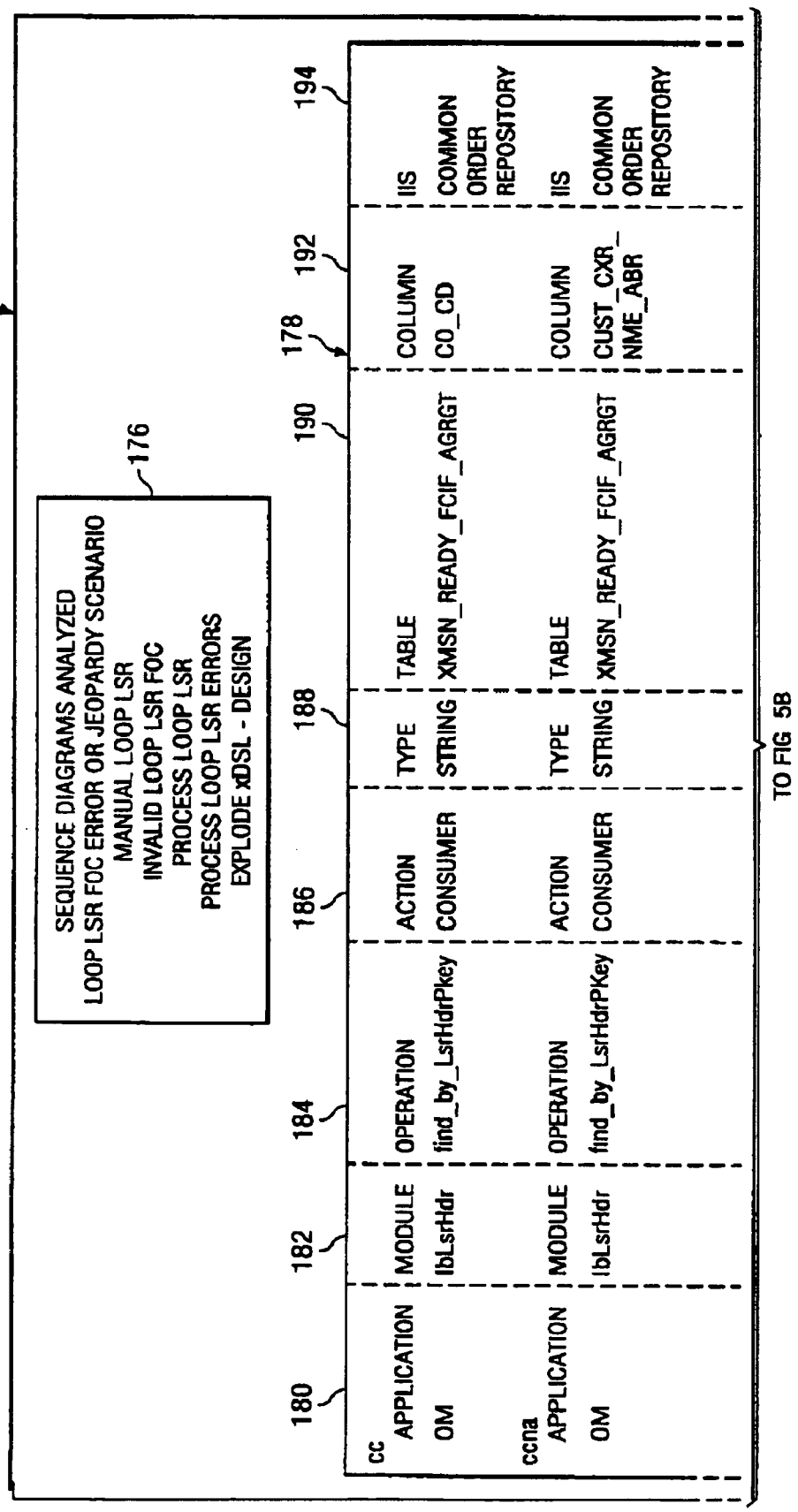

Turning now to FIG. 5, a portion of one type of report, more specifically, a data producer/consumer mapping report 174, which may be generated by the design data validation tool 38 by applying the method of FIG. 3 to a selected portion of the design ICD document 50 will now be described in greater detail. The data producer/consumer mapping report has been selected for further description because it contains all of the information from which the other reports, for example, the producer exception report, the consumer exception report, the design ICD exception report and the Data access layer-to-physical database inconsistency report are derived. The producer/consumer mapping report 174 appears as it is graphically displayed to the user by the design data validation tool 38. The data producer/consumer mapping report 174 illustrated in FIG. 5 was generated, by the design data validation tool 38, for a selected set of sequence diagrams, more specifically, Manual Loop LSR, Invalid Loop LSR FOC, Process Loop LSR, Process Loop LSR Errors and Explode xDSL sequence diagrams, of the design ICD document 50. The selected set of sequence diagrams for which the data producer/consumer mapping report 174 is generated appears in a first portion 176 of the data producer/consumer mapping report 174. Appearing in a second portion 178 of the data producer/consumer mapping report 174 is a data attribute-by-data attribute listing for the selected sequence diagrams. The data producer/consumer mapping report 174 lists each data attribute identified during the examination of the selected portion of the analysis ICD document 48 in alphabetical order. For example, the portion of the data producer/consumer mapping report illustrated in FIG. 5 indicates that, during the examination of the selected set of sequence diagrams, the design data validation tool 38 identified the data attributes "cc", "ccna", "msgInfo" and "pon" during the analysis of the design ICD document 50. Of course, it is contemplated that the identified data attributes may be arranged, within the data producer/consumer mapping report 174, in any desired order. For each data attribute identified during the examination of the selected portion of the design ICD document 50, the producer/consumer mapping report 174 further details each usage of that data attribute. For example, the portion of the data producer/consumer mapping report illustrated in FIG. 5 indicates that there were a single usage of the data attributes "cc" and "ccna", two usages of the data attribute "msgInfo" and four usages of the data attribute "pon", all of which are detailed in the manner hereinbelow described.

The second portion 178 of the data producer/consumer mapping report is divided into first, second, third, fourth, fifth, sixth, seventh and eighth sub-portions 180, 182, 184, 186, 188, 190, 192 and 194, each of which contains a type of information for a usage of a data attribute. More specifically, the first sub-portion 180 identifies the application with which the usage of the data attribute is associated, the second sub-portion 182 identifies the CORBA module with which the usage of data attribute is associated, the third sub-portion 184 identifies the operation with which the usage of the data attribute is associated, the fourth sub-portion 186 identifies whether the data attribute is associated with a data producing or data consuming operation and the fifth sub-portion 188 identifies the type of data attribute subject of the listed usage. The sixth, seventh and eighth sub-portions 190, 192 and 194 describe the physical mapping of the data attribute to the shared databases 22 and 24 which form the IIS 25. More specifically, the eighth sub-portion 194 identifies to which of the shared databases 22 and 24 the data producing or data consuming operation containing the data attribute has been mapped. The sixth sub-portion 190 identifies, within that database, the table to which the data producing or data consuming operation containing the data attribute has been mapped. Finally, the seventh sub-portion 192 identifies, within that table, the column to which the data producing or data consuming operating containing the data attribute has been mapped. For example, the only usage of the data attribute "cc" was part of a physical access to column "CO_CD" of table "XMSN_READY_FCIF_AGRGT" of the common order repository database 22.

It should be readily appreciated that the data producer/consumer mapping report 174 is more comprehensive than the other reports which may be generated by the design data validation tool 34 and that many of the other reports may be readily constructed by merely differing the arrangement of the information presented in the data producer/consumer mapping report 174. For example, a review of the data producer/consumer mapping report 174 reveals that both the "cc" and "ccna" data attributes are consumed but never produced. Thus, both of these data attributes would be identified in a producer exception report. A further review of the data producer/consumer mapping report 174 reveals that the data attribute "pon" is subject to a data access layer-to-physical database inconsistency. More specifically, while the "pon" data attribute was produced and properly consumed twice, the last consumption of the "pon" data attribute was to an incorrect physical address. More specifically, the order application attempted to retrieve the "pon" data attribute from table XMSN_READY_GVIG_AGRGT of the common order repository when the "pon" data attribute was, in fact, maintained in table XMSN_READY_FCIF_AGRGT.

Returning now to FIG. 3, a method of analyzing application-database operations within the design ICD document 50 using the design data validation tool 38 will now be described in greater detail. Prior to commencing the description of the disclosed method of analyzing application-database operations for a model of an enterprise, however, it should be noted that the method by which the design data validation tool 38 acquires data from the selected sequence diagrams and/or selected IDL calls is described in relation to the graphical representation of the sequence diagram 151 illustrated in FIG. 4. It should be clearly understood that the invention has been described in this manner for clarity purposes. When physically embodied, however, the design data validation tool 38 would analyze the selected sequence diagrams and/or selected IDL calls thereof in the form that they are maintained in the memory subsystem 30.

As described herein, the design data validation tool 38 is used for evaluating a selected portion of the analysis ICD document 48. Oftentimes, the design data validation tool 38 is used to evaluate a scenario, i.e., a subset of the sequence diagrams which collectively form the analysis ICD document 38. For example, FIG. 5 illustrates a producer/consumer mapping report 174 generated for a scenario entitled "Loop LSR FOC Error or Jeopardy" which is comprised of the "Manual Loop LSR", "Invalid Loop LSR FOC", "Process Loop LSR", "Process Loop LSR Errors" and "Explode xDSL" sequence diagrams. However, it should be clearly understood that the design data validation tool 38 is equally suitable for analyzing individual sequence diagrams, scenarios of varying sizes and/or all of the sequence diagrams which collectively form the design ICD document 48.

The method commences at step 70 and, at step 72, a scenario or other portion of the design ICD document 50 is selected for examination. For example, the "Loop LSR FOC Error or Jeopardy" scenario comprised of the "Manual Loop LSR", "Invalid Loop LSR FOC", "Process Loop LSR", "Process Loop LSR Errors" and "Explode xDSL-Design" sequence diagrams illustrated in FIG. 5 may be selected at step 72. Alternately, of course, a single sequence diagram, for example, the "Install xDSL" sequence diagram illustrated in FIG. 4 or the entire design ICD document 50 itself may instead be selected at step 72 for examination.

After selecting a scenario or other portion of the design ICD document 50 at step 72 for examination, the method proceeds to step 74 where data acquisition for the selected scenario or other portion of the design ICD document 50 is commenced. As data is acquired from the design ICD document 50, the acquired data is stored in a temporary database or other data store located within the memory subsystem 30. Data acquisition commences at step 76 by the selection of a first sequence diagram of the selected scenario or other portion of the design ICD document 50. The method then proceeds on to step 78 for selection of a first IDL call of the selected sequence diagram. At step 80, the method determines if the selected IDL call is an application-to-database call. In this regard, it is noted that applications 12a through 12h do not access the shared databases 22 and 24 directly. Rather, messages to/from the applications 12a through 12h are passed through the workflow broker 16. It should be further noted that the document being validated is the design ICD document 48. As accesses to the databases are identified at the logical level, the information broker 20 would be the source or target of an application-to-database call. Thus, an application-to-database call may more accurately be referred to as a WB-to-IB call while a database-to-application call may more accurately be referred to as an IB-to-WB call.

As may be seen in FIG. 4, every interface entity of a sequence diagram, for example, the sequence diagram 151, is identified. To determine if the selected IDL call is either a WB-to-IB call or an IB-to-WB call, the identity of the source and target interface entities of the IDL call are checked. If the source and the target interface entities of the selected IDL call are not the WB 16 and the IB 20, the method determines that the selected call is not a WB-to-IB call. Similarly, if the source and the target interface entities of the selected IDL call are not the IB 20 and the WB 16, the method determines that the selected call is not an IB-to-WB call. If it is determined that the selected IDL call is neither a WB-to-IB call nor an IB-to-WB call, the method would then proceed to step 82 where a next call of the selected sequence diagram would be selected and then return to step 80 to again determine if the selected call is either a WB-to-IB or an IB-to-WB call.

Returning to step 80, if the design data validation tool 38 determines that the selected call is either a WB-to-IB or an IB-to-WB call, the method proceeds to step 84 where the design data validation tool 36 examines the selected WB-to-IB or IB-to-WB call to determine if the call contains one or more data attributes. In accordance with the convention used in constructing the sequence diagrams of the design ICD document 50, the alphanumeric character "(" indicates the start of a string of one or more data attributes while the alphanumeric character ")" indicates the end of a string of one or more data attributes. Accordingly, at step 84, the design data validation tool 38 examines the call to determine if it contains both of the aforementioned characters in the sequence "(, . . . ,)." If the design data validation tool 36 determines that the call fails to have this character sequence, the design data validation tool 36 concludes that the call does not contain a data attribute and the method will proceed to step 82 for further processing in the manner previously described. If, however, the design data validation tool 38 determines that the call has this character sequence, the design data validation tool 38 concludes that the call contains at least one data attribute and the method proceeds to step 86 for further processing.

Proceeding on to step 86, a first data attribute of the selected IDL call is selected. As previously set forth, the data attributes of an IDL call are located within the character sequence "(, . . . ,)." Typically, the data attributes are selected in the order that they appear in the aforementioned character sequence. After selecting the first data attribute of the selected IDL call at step 86, the method proceeds to step 88 where data from the design ICD document 50 is acquired for the selected data attribute of the selected IDL call. For example, if the design ICD document being examined was the design ICD document 150, the selected portion of the design ICD document 150 was the sequence diagram 151, the selected IDL call was the IDL call 152-2 and the selected data attribute was the data attribute "state", the design ICD validation tool 38 would determine that the application was the workflow broker 16 (the source interface entity of the IDL call 152-2), the CORBA module would be the OrderStorageHome module (the name of the target interface entity for the information broker 18), the operation would be "create" (the operation name of the IDL call 152-2) and the action would be characterized as a producer action as the target of the IDL call 152-2 is the information broker 18. The design ICD validation tool 38 would further determine a data attribute type for the selected data attribute from a separate portion (not shown) of the design ICD document 50 in which the characteristics of the data attributes are maintained. The design ICD validation tool 38 would then maintain, in the temporary database, the acquired data, together with the selected IDL call and the selected data attribute with which the acquired data is associated. Of course, it should be clearly understood that the types of information described above are purely exemplary and that it is fully contemplated the design ICD validation tool 38 may acquire other types of information may be acquired from the design ICD document 50 as well.

After completing the acquisition of data for the selected data attribute of the selected IDL call from the design ICD document 50 at step 86, the method proceeds to step 88 where the design data validation tool 38 determines if the selected data attribute is the last data attribute for the selected IDL call. If it is determined at step 88 that there are additional data attributes for the selected IDL call, the method proceeds to step 90 for selection of a next data attribute of the selected IDL call and then returns to step 86 for acquisition of data, from the design ICD document 50, for the newly selected data attribute in the manner previously described. If, however, it is determined at step 88 that the selected data attribute is the last data attribute for the selected IDL call, the method will instead proceed to step 92 where the design data validation tool 38 determines if the selected IDL call is the last IDL call for the selected sequence diagram. If it is determined at step 92 that there are additional IDL calls for the selected sequence diagram, the method proceeds to step 94 for selection of a next IDL call for the selected sequence diagram and then returns to step 80 for further processing of the newly selected IDL call in the manner previously described.

If, however, it is determined at step 92 that the selected IDL call is the last IDL call for the selected sequence diagram, the method proceeds to step 96 where the design data validation tool 38 determines whether the selected sequence diagram is the last sequence diagram of the selected portion of the design ICD document 50. If it is determined that there are additional sequence diagrams of the selected scenario or other portion of the design ICD document 50 to be analyzed, the method proceeds to step 98 for selection of a next sequence diagram of the selected scenario or other portion of the design ICD document 50. The method then returns to step 78 for further processing of the newly selected sequence diagram in the manner previously described. If, on the other hand, it is determined at step 96 that the selected sequence diagram is the last sequence diagram of the selected scenario or other portion of the design ICD document 50 being analyzed, the method proceeds to step 100 for acquisition of data from the physical mapping repository document 49. Prior to further discussion of the disclosed method, however, it should be clearly noted that the foregoing is but one method by which the desired data may be acquired from the design ICD document 50 and it is fully contemplated that a wide variety of other techniques may be equally suitable as well.

At step 100, the design ICD validation tool 38 acquires data from the physical mapping repository document 49. As previously set forth, within the physical mapping repository document is a series of IDL calls and the mapping of those IDL calls to specific locations within the physical databases 22 and 24 forming the IIS 25. To acquire the desired data, the design ICD validation tool 38 executes a function call through Java to retrieve the physical database mappings for each IDL call for which data acquired from the design ICD document 50 is being maintained in the temporary database. Upon acquiring the desired data from the physical mapping repository document 49, for example, the database name and physical location associated with each IDL call for which data acquired from the design ICD document 50 is being maintained in the temporary database, the method proceeds to step 102 where one or more reports are constructed by combining the data acquired from the design ICD database 50 and the data acquired from the physical mapping repository document 49. One such report which may be constructed at step 102 would be a producer consumer mapping report such as that illustrated in FIG. 5. To construct such a report, the physical mapping information retrieved from the physical mapping repository document 49 would be appended to the information retrieved from the design ICD document 50 for a data attribute by matching the IDL call associated with the retrieved physical mapping information to the IDL call associated with the data attribute. More specifically, for each usage of a data attribute by an IDL call, selected information was retrieved from the design ICD document 50. Furthermore, for each such IDL call, selected data was retrieved from the physical mapping repository document 49. To construct a producer consumer mapping report such as the producer consumer mapping report 174, the IDL call associated with each data attribute would be matched to the corresponding IDL call for which information was retrieved from the physical mapping repository document 49. The information associated with the corresponding IDL call from the physical mapping repository document 49 would then be associated with the data attribute and the information retrieved from the design ICD document 50 to complete construction of an entry for the producer consumer mapping report. The entries would then be grouped by data attribute and then sorted into alphabetical order. Other reports which may be generated include a producer exception report, a consumer exception report, an orphan update report, a design ICD exception report or a data access layer-to-physical database inconsistency report. Of course, such reports would be generated using a slightly different process.

After the producer consumer mapping report or other desired reports are constructed at step 102, the design ICD data validation tool 38 may generate a display of the constructed reports on a monitor or similar device and the method will proceed to step 104 for analysis of the constructed reports. For example, as previously set forth, an analysis of the producer consumer mapping report 174 indicates that two data attributes, specifically, the "cc" and "ccna" data attributes were consumed but not produced and a third data attribute, specifically, the "pon" data attribute, included a consumption from an incorrect physical location.

Upon completing analysis of the constructed reports at step 104, the method proceeds to step 106 where a determination is made if the analysis of the constructed reports reveal any exceptions. For example, in the example described herein, an analysis of the constructed reports revealed three exceptions hereinabove described. If exceptions have been noted, then the design ICD document 50 has not yet been validated to the physical layer of the shared databases. The method would then proceed to step 108 where the design ICD document 50 and/or the physical mapping repository document 49 are corrected based upon the aforementioned exceptions noted in the constructed reports. The method would then return to step 72 where the corrected design ICD document 50 would be examined in the manner previously described. As contemplated herein, a typical revision to the design ICD document 48 intended to validate the design encompass the addition, deletion or revision of one or more of the data attributes which form part of the IDL calls set forth in the various sequence diagrams of the design ICD document 48. For example, if the constructed report indicates that a data attribute contained in an IDL call subject of a FIND_BY operation to an LsrHdr interface of the information broker 20 was consumed but never produced, a call containing a CREATE operation to that interface may be added to the design ICD document 50. Further by way of example, if the constructed report reveals that a data attribute contained in an IDL call executing a FIND_BY operation to the LsrHdr interface of the information broker 20 attempts to access an incorrect physical address, the physical mapping repository document 49 may be revised using the IBAR tool 37 to correct the physical address accessed by that operation.

Returning to step 106, if, however, the analysis of the constructed reports do not reveal any exceptions, the method proceeds to step 110 where it is determined that the design ICD document 50 has been validated to the physical layer. Upon validating the analysis ICD document 48 at step 110, the method then ends at step 112.

It should be further noted that, by revising the design ICD document 50 to remove the inaccuracies noted during analysis of the constructed reports, the quality of the design model of the integrated enterprise 10 being constructed is enhanced. As a result, when the integrated enterprise 10 is constructed using the design ICD document 50 and other modeling documents as a guide, the likelihood of errors occurring during the testing and/or operation of the integrated enterprise 10 is reduced. In particular, when used in the manner herein describe, the design data validation tool 38 reduces the likelihood of errors occurring within the integrated enterprise 10, for example, during the testing and/or operation thereof, when asked to perform a task which involves an interaction between an application and a shared database.

Thus, there has been described and illustrated herein, a design data validation tool suitable for use in enterprise architecture modeling. By analyzing, to the physical layer, database operations contained within a model of an enterprise based upon the usage of data attributes, the design data validation tool may be used to identify exceptions in the analyzed database operations. However, those skilled in the art should recognize that numerous modifications and variations may be made in the techniques disclosed herein without departing substantially from the spirit and scope of the invention. Accordingly, the scope of the invention should only be defined by the claims appended hereto.

What is claimed is:

1. For a portion of an enterprise network having at least two applications tangibly embodied on a computer readable medium and an IIS comprised of one or more databases, a method of validating said portion of said enterprise network by modeling the interface of IDL call structure to a physical location of said one or more databases forming said IIS, comprising:

analyzing at least one modeled IDL call to/from said IIS on a data attribute-by-data attribute basis; analyzing a map of each one of said at least one analyzed modeled IDL call to a physical location within said one or more databases forming said IIS; and associating said data attributes of said analyzed modeled IDL calls with said physical locations to which said analyzed modeled IDL calls are mapped, and storing said associations of said data attributes of said modeled IDL calls with physical locations on a computer readable medium.

2. The method of claim 1, wherein said analyzed modeled IDL calls include data producing IDL calls and data consuming IDL calls and further comprising:

identifying, on a data attribute-by-data attribute basis, inconsistencies between said mapping of said data producing IDL calls and said data consuming IDL calls.

3. The method of claim 2, and further comprising modifying said map based upon said identified inconsistencies between said mapping of said data producing IDL calls and said data consuming IDL calls.

4. The method of claim 3, and further comprising modifying said at least one modeled IDL call based upon said identified inconsistencies between said mapping of said data producing IDL calls and said data consuming IDL calls.

5. For a portion of an integrated enterprise network having at least two applications tangibly embodied on a computer readable medium and an US comprised of one or more databases, a method of validating said portion of said enterprise network by modeling the Interface of IDL call structures to a physical layer location of said one or more databases forming said IIS, comprising: constructing a first document, said first document describing a plurality of modeled IDL calls to/from said IIS of said integrated enterprise; constructing a second' document, said second document mapping said plurality of modeled IDL calls to said physical layer of said one or more databases forming said IIS; generating, from said first document, a list of data attributes contained in one or more of said plurality of modeled IDL calls; associating; with each data attribute contained in said list of data attributes, a list of modeled IDL calls in which said data attribute is contained; for each modeled IDL call associated with one of said data attributes contained in said list of data attributes, retrieving; from said second document, a physical location with said at least one database forming said US to which said modeled IDL call is mapped; and for each physical location, retrieved from said second document, to which one of said modeled IDL calls associated with one of said data attributes contained in said list of data attributes, associating said physical location with said one of said modeled IDL calls and said one of said data attributes, and storing said associations of said data attributes of said modeled IDL calls with physical locations on a computer readable medium.

6. The method of claim 5, wherein said first document is comprised of a plurality of sequence diagrams, each containing at least one modeled IDL call, and wherein generating, from said first document, a list of data attributes contained in one or more of said plurality of modeled IDL calls further comprises:

selecting a scenario comprised of at least one of said plurality of sequence diagrams; and examining each one of said at least one modeled IDL calls of each one of said at least one sequence diagrams of said selected scenario; and adding, to said list of data attributes, each data attribute contained in at least one of said at least one modeled IDL calls of at least one of said at least one sequence diagrams of said selected scenario.

7. The method of claim 6, wherein said first document is a design ICD document for said integrated enterprise.

8. The method of claim 5, and further comprising:

for each one of said data attributes contained in said list of data attributes, identifying inconsistencies between said modeled IDL calls associated with said data attribute and said physical locations associated with said modeled IDL calls.

9. The method of claim 8, wherein said identified inconsistencies include inconsistencies between which physical database said modeled IDL calls associated with said data attribute are directed.

10. The method of claim 8, wherein said identified inconsistencies include inconsistencies between which table, maintained within a physical database, said modeled IDL calls associated with said data attribute are directed.

11. The method of claim 8, wherein said identified inconsistencies include inconsistencies between which column, within a table maintained within a physical database, said modeled IDL calls associated with said data attribute are directed.

12. The method of claim 8, wherein said first document is comprised of a plurality of sequence diagrams, each containing at least one modeled IDL call, and wherein generating, from said first document, a list of data attributes contained in one or more of said plurality of modeled IDL calls further comprises:

selecting a scenario comprised of at least one of said plurality of sequence diagrams; and examining each one of said at least one modeled IDL calls of each one of said at least one sequence diagrams of said selected scenario; and adding, to said list of data attributes, each data attribute contained in at least one of said at least one modeled IDL calls of at least one of said at least one sequence diagrams of said selected scenario.

13. The method of claim 12, wherein said first document is a design ICD document for said integrated enterprise.

14. A device for validating an integrated enterprise, said integrated enterprise having first and second applications and an IIS comprised of at least one database, said device comprising:

a UML tool for constructing a model of said integrated enterprise by modeling the interface of IDS calls between said at least two applications and said IIS; and a tool for analyzing said model of said integrated enterprise, said tool identifying inconsistencies between modeled IDL calls associated with data attributes for said model of said integrated enterprise and physical locations associated with said modeled IDL calls, and storing said inconsistencies on a computer readable medium.

15. The device of claim 14, wherein said UML tool is used to construct a first document containing associations between modeled IDL calls and data attributes of said model of said integrated enterprise.

16. The device of claim 14, and further comprising an IBAR tool for constructing a second document containing associations between said modeled IDL calls of said model of said integrated enterprise and physical locations within said at least one database forming said IIS.

* * * * *